Figure 1:
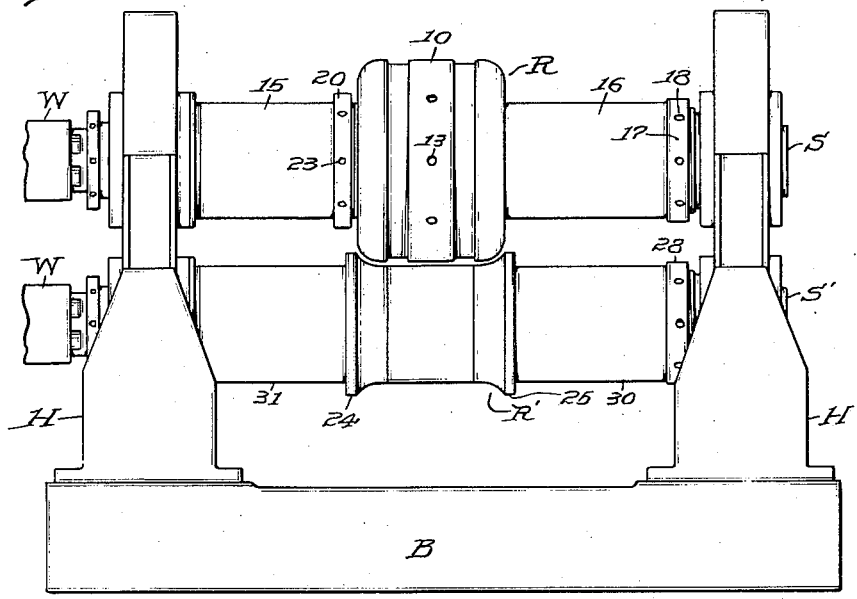

Dec. 12, 1939. C. FIRTH 2,182,842

FORMING MACHINE ROLL

Filed Sept. 9, 1938 2 Sheets-Sheet 1

INVENTOR
Cyril Firth

WITNESS
F. J. Hartman

BY
ATTORNEY

Dec. 12, 1939. C. FIRTH 2,182,842
FORMING MACHINE ROLL
Filed Sept. 9, 1938 2 Sheets-Sheet 2

WITNESS
F. J. Hartman.

INVENTOR
Cyril Firth
BY
ATTORNEY

Patented Dec. 12, 1939

2,182,842

UNITED STATES PATENT OFFICE 2,182,842

FORMING MACHINE ROLL

Cyril Firth, Youngstown, Ohio, assignor to The Youngstown Sheet and Tube Company, Youngstown, Ohio, a corporation of Ohio Application September 9, 1938, Serial No. 229,051

4 Claims. (Cl. 153—58)

My invention relates to forming machines used for converting flat metal blanks to substantially cylindrical shape preparatory to their being welded into pipes or tubes and is particularly concerned with the rolls utilized in such machines.

The formed blanks are customarily electrically welded and where electrodes are used to convey the welding current into their juxtaposed edges the latter must coincide very accurately with the curvature of the electrodes and vice versa. With a suitable forming machine adapted for the production of blanks for pipe of given diameter and wall thickness, no great difficulty is ordinarily encountered in obtaining the proper conditions of fit between the edges of the blanks and the electrode contact surface. However, if it is desired to use a blank of another thickness so as to produce a pipe correspondingly thinner or thicker, the distance between the rolls of the forming machine must be correspondingly adjusted, and this results in changing the relationship of the cooperating curved surfaces of the rolls so that while the center part of the plate is properly accommodated in the pass between them, the shape of the pass at its ends is altered and the edges of the formed-up blank do not fit the electrodes with the requisite exactitude while the blank has a tendency to twist and strain in its passage through the rolls and to camber after it is formed.

Consequently in forming machines as at present constructed it is necessary to install an entirely new set of rolls whenever the thickness of the plates on which they operate is changed for a given size of pipe, and this is a very tedious and labor consuming operation during which the entire forming machine must be shut down and the welding and finishing machines which consecutively operate upon the formed blank it produces also lie idle. Moreover, it is difficult to properly align with each other the rolls of each pair comprised in the forming machine when the new rolls are being installed so that a further loss of time and resultant expense is thereby entailed.

It is therefore a principal object of my invention to provide an adjustable forming roll which may be expanded or contracted axially to maintain the proper relation between its curved surfaces and the corresponding curved surfaces of the other roll of the pair when the distance between the axes of the rolls is changed to accommodate plates of different thickness and thereby avoid the necessity of installing different rolls for each thickness of plate in order to insure an easy and natural flow of the metal therebetween and the requisite nicety of fit between the edges of the formed blank and the electrodes during the subsequent welding operation.

A further object of my invention is the provision in a forming machine of means whereby with a minimum of time and effort each pair of its rolls can be accurately aligned with each other and consequently with all the other pairs when assembling them in the machine.

Still further objects of the invention are to enhance the general ease and facility with which the rolls can be installed; to enable the relationship between each pair of rolls to be readily varied and thereafter maintained until readjustment is required because of a change in the thickness of the plates which are to be formed, and to attain these results through the provision of means which are simple, readily operable and of such character as not to get out of order or become damaged under the severe conditions of use to which the rolls of forming machines are necessarily subjected.

Additional objects, advantages and novel features of design, construction and arrangement comprehended by the invention are hereinafter more particularly pointed out or will be apparent to those skilled in the art from the following description of a preferred embodiment thereof as illustrated in the accompanying drawings.

It will of course be understood that forming machines of the general character of those to which my invention more particularly relates comprise a series of stands of rolls through which the initially flat blank is progressively passed and thereby gradually converted to a desired cross sectional form preparatory to its ultimate passage to the welding machine. Consequently the configuration of each successive pair of rolls and the pass defined thereby varies somewhat from the preceding set, but as my invention is equally applicable to the rolls of any of the pairs designed to operate more particularly on the edges of the blank it is only necessary to herein explain it in connection with one set of such rolls as comprised in a single stand.

Figure 2:
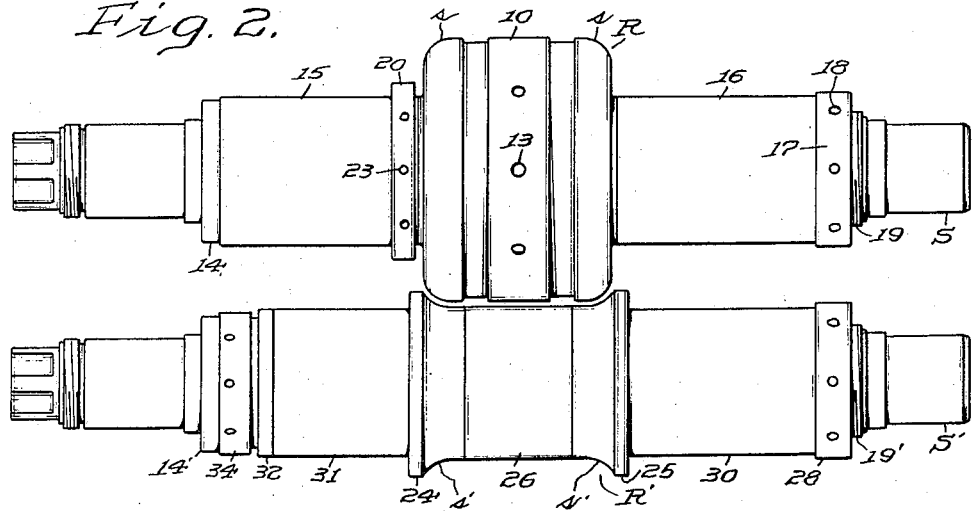
Figure 3:
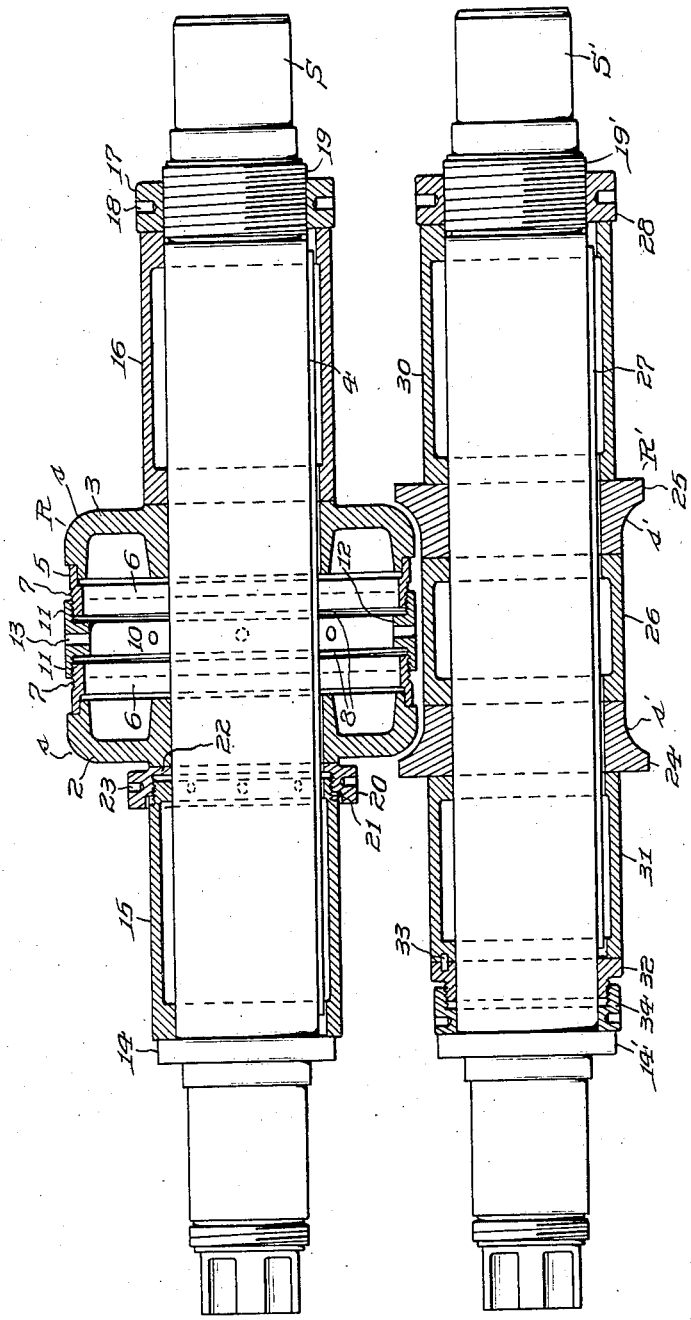

Therefore, in Fig. 1 of the drawings I have shown in front elevation a typical roll stand of a forming machine comprising edge forming rolls constructed in accordance with my invention;

Fig. 2 is an elevation on a larger scale of the rolls removed from the stand but occupying the same relative positions as when operatively installed therein; and Fig. 3 on a still larger scale is a longitudinal section through the rolls with the roll shafts shown in elevation.

The same characters of reference are used to designate corresponding parts throughout the drawings.

More particularly, the roll stand proper comprises a base B from which rise laterally spaced housings H—H in which the roll shafts S, S' are respectively journaled in the customary way, the shafts extending beyond one of the housings for the reception of wobblers W through which they are driven. The upper shaft S carries the upper forming roll R and the lower shaft S' the lower forming roll R', and I shall first describe the construction of the upper roll and adjacent parts and then that of the lower roll and its respectively adjacent parts.

As best shown in Fig. 3, the upper roll comprises a pair of axially spaced, circular generally disk-like end members 2, 3 having their outer corners rounded to provide convex surfaces s of suitable curvature to properly form the edges of the plate at that point in its progression through the forming machine at which the rolls are located. The roll shaft S comprises a key 4 and the end members are centrally bored and provided with corresponding keyways so that when assembled on the shaft with their keyways in registry with the key they will turn with it. Each end member is chamfered out at its inner corner to form an annular seat 5 of smaller diameter than the periphery of the member adapted to support the adjacent end of a spacer ring 6, two of these rings being provided and respectively disposed inwardly of each end member. The outer end of each spacer ring is also desirably chamfered so as to receive the corner of the seat 5 and the outside diameter of the rings is somewhat less than that of the end members so the latter project beyond the rings when they are in position. Adjacent its opposite or inner end each spacer ring is provided with external threads 7, preferably of rather low pitch, the threads on one ring being right hand and those on the other ring left hand, and between the spacer rings is disposed an adjusting ring 10 substantially T-shaped in radial section and thus comprising oppositely outwardly directed flanges 11 and an annular body 12 preferably provided with circumferentially spaced spanner holes 13 into which a bar can be inserted to facilitate turning the ring. The flanges 11 of the adjusting ring are provided with internal threads 8 respectively cooperative with the adjacent threads on the spacer rings and consequently of opposite pitch, and it will be thus be apparent that when the end members, spacer rings and adjusting ring are assembled on shaft S, rotation of the adjusting ring is effective to move the spacer rings toward or away from each other in accordance with the direction in which the adjusting ring is turned and thereby increase or decrease the axial distance between the outer ends of the spacer rings against which end members 2, 3 abut.

One extremity of the shaft S is designed in the usual way for reception in one of the journal boxes of the roll stand and for the attachment of the wobbler by which it is driven and the opposite extremity of the shaft is correspondingly designed for reception in the journal box at that side of the roll stand.

The shaft is also provided near one end with a circumferential shoulder 14 either integral with the shaft or fixed thereto in any suitable way, and means now to be described are provided for holding the roll assembly comprising end members 2, 3, spacer rings and adjusting ring in proper longitudinal position on the shaft.

More particularly said means comprise a spacer sleeve 15 the outer end of which abuts shoulder 14 and the inner end of which is furnished with roll adjusting means hereinafter described, another spacer sleeve 16 on the opposite side of the roll and an internally threaded collar 17, conveniently provided with spanner holes 18, on the adjacent portion of the shaft which is threaded at 19 for its reception.

The adjusting means associated with the spacer sleeve 15 comprise an internally threaded nut 20 surrounding and cooperative with threads 21 on the adjacent end of the spacer and having a lip 22 abutting the roll end member 2, spanner holes 23 being desirably provided in the nut, the inner diameter of which is of course sufficient to allow it to clear the key 4 when it is turned on the spacer since the key is extended far enough in each direction to enter keyways provided in spacer sleeves 15, 16 and prevent them from rotating on the shaft.

The various parts can be readily assembled on the latter by sliding them consecutively thereover from the end opposite shoulder 14, beginning of course with spacer sleeve 15, the spacer rings 6 and adjusting ring 10 being preferably previously screwed together, and it will be apparent that when collar 17 is thereafter screwed home all the parts are held against axial movement. However, by slightly backing off the collar so that the adjusting ring 10 can be freely turned, the distance between the end members 2, 3 of the roll can be increased or decreased within limits as hitherto explained while with any given setting of the end members as determined by the rotatively adjusted position of that ring, the roll as a whole can be moved axially of the shaft by suitable manipulation of nut 20 and collar 17.

Since the axial length and alignment of the upper roll R can be varied with relation to lower roll R', it is unnecessary to make any alteration in the latter when changing from one thickness of plate to another, and the lower roll may therefore comprise but a single element though I prefer to form it of a plurality of separate elements as shown, namely, end members 24, 25 having concave surfaces s' concentric or substantially so with the surfaces s of the upper roll to which they are respectively complementary and a spacing sleeve 26 interposed between the end members and, like them, provided with a keyway for the reception of a key 27 on the shaft S' so the parts when assembled thereon are prevented from turning relatively thereto. Shaft S' is generally similar to shaft S and therefore provided with a fixed shoulder 14' adjacent one end and a threaded zone 19' adjacent the other for the reception of an internally threaded collar 28 between which and the adjacent end member 25 of the roll is disposed a spacer sleeve 30. Adjacent the opposite end member 24 is another spacer sleeve 31 and at the outer end thereof a collar 32, a series of dowel pins 33 extending oppositely into the abutting portions of the collar and sleeve holding the latter from rotation with respect to the former yet permitting the parts to be easily separated when desired. The outer end of collar 32 is preferably of smaller diameter than the end adjacent the spacer sleeve and is externally threaded for the reception of a hollow nut 34 correspondingly internally threaded and lying between collar 32 and the fixed shoulder 14' on the shaft. It will therefore be apparent that the several parts carried by shaft S' can be readily assembled thereon by slipping them consecutively over its threaded end and that thereafter when collar 28 is set up they are held securely in place and prevented from axial movement along the shaft.

In order to insure the placement of roll R' in its proper position axially of the shaft, it is only necessary, either preparatory to or during the operation of assembling the parts, to determine the distance at which end member 24 of the roll should be from shoulder 14' and to adjust nut 34 so the distance from its outer face to the inner end of spacer sleeve 31 will correspond thereto; then when the shaft with its attached parts is disposed in the roll stand, roll R' will occupy that position. However, if it becomes desirable for any reason to thereafter move the roll axially of the shaft for a limited distance in either direction it is only necessary to loosen collar 28 slightly, suitably adjust nut 34 so as to decrease or lessen the distance between shoulder and the inner end of spacer sleeve 31 and then retighten the collar.

In generally like manner the position of the upper roll R on its shaft S can be predetermined during assembly by suitable adjustment of nut 20 and can be varied if necessary after the roll and shaft have been installed in the forming machine so as to bring the roll into proper alignment with lower roll R'.

The spacing between the mutually cooperating curved surfaces s, s' of the rolls is of course determined by the thickness of the plate which is being operated upon, and as long as no change is made therein the said spacing does not have to be altered. However, assuming it be desired to form a thicker plate than that for which the machine has been previously set, it is necessary to increase the distance between the axes of the rolls so as to widen the pass between them by an amount sufficient to accommodate the increased thickness of the plate. This backing off separates surfaces s, s' vertically but not horizontally and consequently disturbs their normal concentricity so that while the center part of the thicker plate can readily pass between the rolls, its edges tend to bind and strain in the pass and are improperly formed since the space between the ends of said surfaces which are tangent to vertical lines is less than between those ends thereof which are tangent to horizontal lines. However, this difficulty is readily overcome by my invention as by suitable manipulation of adjusting ring 10 after the rolls have been backed off the proper distance to accommodate the thicker plate, the end members of the upper roll can be caused to approach each other sufficiently to substantially preserve the concentricity of surfaces s and s' and thus form a pass of substantially the same width throughout their entire extent. In like manner if a thinner plate is to be operated upon, the axes of the rolls are moved toward each other for a suitable distance and the end members of the upper roll then moved away from each other sufficiently to again bring surfaces s, s' into substantial concentricity.

The invention therefore obviates the necessity of installing an entirely new pair of rolls, or at least a different upper roll in each pair, whenever the thickness of the blanks is to be changed in the manufacture of a given size of pipe, though of course when the size of the pipe is to be changed other rolls of different curvature are required and, further, enables the rolls to be accurately aligned with each other with a minimum of time and effort, so that its use not only reduces the investment in and expense of upkeep of a series of non-adjustable rolls suitable for forming blanks of different thickness for each size of pipe but enhances the productive capacity of the forming machine and associated welding and finishing machines by materially lessening the time required for changing over the forming machine from one thickness of plate to another and lowers the expense incident thereto.

While I have herein described a preferred embodiment of the invention with considerable particularity, I do not thereby desire or intend to confine or restrict myself specifically thereto as changes and modifications may be made in the design, construction, arrangement and method of assembly of the various elements if desired without departing from the spirit and scope of the invention as defined in the appended claims.

Having thus described my invention, I claim and desire to protect by Letters Patent of the United States:

1. A shaft and roll assembly for a forming machine comprising a shaft having a fixed shoulder, a pair of circular roll end members mounted in axially spaced relation thereon, means interposed between said members adapted to adjustably space them apart, an adjustable collar on the shaft on the opposite side of the roll end members from said shoulder, and means respectively interposed between the latter and the adjacent end member and between the other end member and the collar for positioning axially of the shaft the end members and interposed adjusting means as a unit.

2. A shaft and roll assembly for a forming machine comprising a shaft having a fixed shoulder adjacent one end, an adjustable collar adjacent the other end, a pair of oppositely disposed axially spaced circular roll end members between the shoulder and the collar, a pair of spacing rings interposed between the members and respectively engaging therewith, an adjusting ring between and in threaded engagement with said spacer rings rotatable to vary the distance between them, and means respectively disposed about the shaft between the shoulder and adjacent roll member and between the other member and the collar adapted to hold in predetermined position axially of the shaft said members, spacer rings and adjusting ring as a unit.

3. A shaft and roll assembly for a forming machine comprising a shaft having a fixed shoulder adjacent one end and an adjustable collar adjacent the other, a roll between said shoulder and collar comprising a pair of oppositely disposed, circular axially spaced end members, a pair of spacer rings interposed therebetween with their outer ends respectively engaging said members, and having threads of opposite pitch on their inner ends, an adjusting ring interposed between the spacer rings in threaded engagement with the latter and rotatable to vary the spacing between the rings, a spacer sleeve interposed between said collar and adjacent end member, and a spacer sleeve interposed between the shoulder and adjacent member, one of said sleeves comprising adjusting means for varying its length.

4. A shaft and roll assembly for a forming machine comprising a shaft having a fixed shoulder adjacent one end and an adjustable collar adjacent the other, a roll between said shoulder and collar comprising a pair of oppositely disposed, circular axially spaced end members, a pair of spacer rings interposed therebetween with their outer ends respectively engaging said members and having threads of opposite pitch on their inner ends, an adjusting ring interposed between the spacer rings in threaded engagement with the latter and rotatable to simultaneously move the rings axially in opposite directions, a spacer sleeve interposed between said collar and adjacent end member, a spacer sleeve interposed between the shoulder and adjacent member, and a nut surrounding and in threaded engagement with an end of said last mentioned sleeve for varying the effective length thereof.

CYRIL FIRTH.